United States Patent [19]

Weil

[11] Patent Number: 5,437,480
[45] Date of Patent: Aug. 1, 1995

[54] PRESSURE SEALED CONNECTING APPARATUS FOR CONDUITS CARRYING PRESSURE MEDIA

[76] Inventor: Hans A. Weil, Schipfe 49, CH-8001 Zürich, Switzerland

[21] Appl. No.: 119,970

[22] Filed: Sep. 13, 1993

[30] Foreign Application Priority Data

Sep. 14, 1992 [CH] Switzerland ............... 02886/92

[51] Int. Cl.[6] ........................................ F16L 27/04
[52] U.S. Cl. ......................... 285/167; 285/190; 285/184; 285/276; 285/261; 285/332.1
[58] Field of Search .............. 285/276, 178, 167, 184, 285/332.1, 190, 261, 166

[56] References Cited

U.S. PATENT DOCUMENTS

| 275,098 | 4/1883 | Walker | 285/167 |
|---|---|---|---|
| 1,782,484 | 11/1930 | Spencer et al. | 285/167 |
| 1,874,541 | 8/1932 | Jonsson | 285/178 X |
| 4,040,650 | 8/1977 | Shotbolt | 285/184 X |
| 4,133,558 | 1/1979 | Ahlstone | 285/167 X |
| 5,067,753 | 11/1991 | Porel . | |
| 5,215,338 | 6/1993 | Kimura et al. | 285/167 X |

FOREIGN PATENT DOCUMENTS

| 2037922 | 7/1980 | United Kingdom | 285/167 |
|---|---|---|---|
| 93023696 | 11/1993 | WIPO | 285/167 |

Primary Examiner—Eric K. Nicholson
Assistant Examiner—Heather Chun Shackelford
Attorney, Agent, or Firm—Spencer, Frank & Schneider

[57] ABSTRACT

A pressure sealed connecting apparatus is provided for the connection of first and second conduits adapted to carry a pressure medium and to rotate relative to one another. Each of the conduits has tangentially contacting countersurfaces for contacting spherical surface areas of a rotation body situated between the first conduit and the second conduit. The rotation body has spherical surface areas adapted to be in rotational sealing contact with the tangentially contacting countersurfaces of each of the conduits. The connecting apparatus is further configured such that: the rotation body is sleeve-shaped; each of the conduits has an inner shoulder thereon; the tangentially contacting countersurfaces of each of the conduits are conical ring surfaces axially limited by corresponding inner shoulders on the conduits; the spherical surface areas of the rotation body are zone-like spherical superficies resting on the conical ring surfaces; and the connecting apparatus further comprises a slide cam disposed on the inner shoulders of one of the first conduit and the second conduit for acting on the rotation body to force the rotation body into an inclined position; and a stop disposed on the inner shoulders of another one of the first conduit and the second conduit such that the slide cam forces the sleeve into the inclined position up to the stop.

7 Claims, 2 Drawing Sheets

PRESSURE SEALED CONNECTING APPARATUS FOR CONDUITS CARRYING PRESSURE MEDIA

BACKGROUND OF THE INVENTION

The present invention relates to a pressure sealed connecting apparatus for the connection of two conduits carrying a pressure medium and rotating relative to one another, between which there is situated at least one rotation body which is in rotational and sealing frictional contact with the conduits through spherical surface areas and tangentially contacting countersurfaces.

From U.S. Pat. No. 5,067,753 a so-called rotary transmission of the above kind has become known, in which the fixed conduit with the longitudinal axis X comprises a rotationally rigid, axially displaceable sleeve-like piston with a hemispherical head and the rotating conduit with the longitudinal axis Z comprises an end zone also with a hemispherical head, between which a rotating core piece has been inserted with two opposite concave-conical bearing surfaces for a substantially liquid-sealed cooperation with the ball heads. The end zone of the rotating conduit with its longitudinal axis Y is displaced parallel to the axes X and Z of the conduits, with the rotating core piece compensating the displacement between the ball heads. Such a rotary transmission only allows an axial arrangement and is complex in its arrangement owing to the existing eccentricity. Consequently, it is very expensive.

SUMMARY OF THE INVENTION

Therefore, it is the primary object of the present invention to provide a pressure sealed connecting apparatus of the kind mentioned above which enables a design providing axial passage of the medium and the advantage arising therefrom being that of a small radial size as well as an arrangement with radial deflection of the passage of the medium and the advantage arising therefrom of a possible penetration of the conduit acting as a shaft for transmitting function signals. Furthermore, the apparatus of the present invention stands out because of its simple arrangement, high output and small sealing diameter.

The above object is achieved according to the invention by the provision of a rotation body in the form of a sleeve with spherical, preferably equatorially spherical zone-like superficies and rests on the conduits with the superficies between tangentially contacting conical ring surfaces, with at least one slide cam acting on the sleeve for forcing the sleeve into an inclined position.

It may be preferable in this respect that the conical ring surfaces on the conduits be axially limited by inner shoulders, on one of which the slide cam is situated for forcing the sleeve up to the stop on the other inner shoulder into the inclined position. It is also advantageous for the slide cam to be effective on an equatorial slide ring on the sleeve and to force the sleeve up to a stop on the front side of the slide ring into an inclined position.

In a preferred embodiment of a rotary transmission in axial arrangement it may be favourable if the one conical ring surface supporting the rotational sleeve is arranged on the front side on the fixed conduit and the other conical ring surface is provided at the free end of a sealingly situated pressure sleeve which is axially displaceable on the shaft-like conduit against the force of a spring and which is rotationally rigid.

The arrangement could be configured such that the slide cam is situated on the inner shoulder of the pressure sleeve.

Furthermore, it is favourable if the slide diameter between the pressure sleeve and the conduit is substantially equivalent to the contact circle between conical ring surfaces and the spherical superficies of the rotation sleeve.

Furthermore, a further embodiment may be arranged in such a way that the rotating conduit is supported through a roller bearing or through a hydrostatical axial bearing.

For a radial passage of the medium, the embodiment in accordance with the invention may be arranged in such a way that in a coaxial twin arrangement for a radial passage of the medium the rotating shaft-like conduit penetrates a pressure chamber in which a symmetrical guide ring, which forms the rotationally rigid conduit and is provided with conical ring surfaces on the ends thereof, encompasses the rotating conduit, on each of whose ring surfaces rests a rotation sleeve with spherical superficies which each cooperate on outer ends thereof with a pressure sleeve, with radial bores in the conduit opening out into the pressure chamber which is in flow connection with a transversal bore in the casing via a radial bore in the guide ring.

BRIEF DESCRIPTION OF THE DRAWING

Exemplary embodiments of the subject matter of the invention are outlined in greater detail below by reference to the accompanying drawings, wherein.

DETAILED DESCRIPTION OF THE PREFERRED EMBODIMENT

Figure 1:
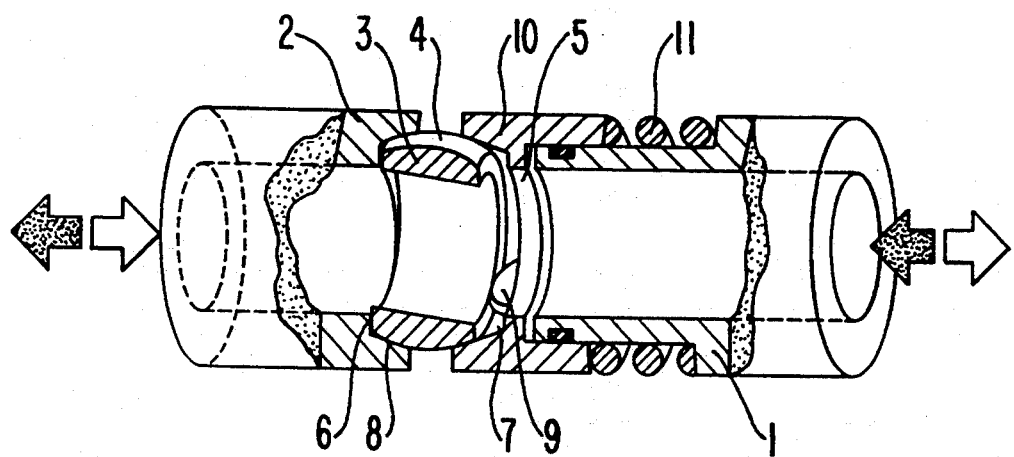
FIG. 1 is a schematic diagrammatic view in a partial section of a pressure sealed rotary transmission of axial design.

The pressure sealed connecting apparatus in accordance with FIG. 1 for the connection of two conduits rotating with respect to one another and carrying a pressure medium comprises a shaft-like rotating conduit 1 and a fixed conduit 2, with the so-called rotary transmission being of radial arrangement here.

Between conduits 1 and 2 there is a rotation body in the form of a sleeve 3 with an equatorially spherical zone-like superficies 4, over which sleeve 3 rests on conduits 1 and 2 between tangentially contacting conical ring surfaces 7 and 8, respectively, which are each axially limited by an inner shoulder 5 and 6, respectively. The conical entrance forming the one ring surface is arranged directly on the face side on the fixed conduit 2, whereas the conical entrance forming the other ring surface 7 is provided at the front end of a pressure sleeve 10 placed axially displaceably on the front end of the shaft-like conduit 1, a front end of the pressure sleeve and the shaft-like conduit being defined at a region of the above components which is closest to the fixed conduit 2.

The pressure sleeve 10 is rotationally rigidly and sealingly arranged on the shaft-like conduit 1 and is subject to the force of a pressure spring 11 in such a way that the rotation sleeve 3 is compressed between the axially opposing conical ring surfaces 7 and 8.

In similar sliding conditions in the circles of contact between the spherical superficies 4 of the rotation sleeve 3 and the tangentially adjacent conical ring surfaces 7 and 8, the rotation sleeve 3 tries to assume a mean speed between the two ring surfaces 7 and 8 of conduits 1 and 2 that is, a speed which is the mean of the speeds assumed by the two ring surfaces 7 and 8.

Of importance for the invention is further the arrangement of a slide cam 9 on one of the inner shoulders 5 or 6, axially limiting the conical ring surfaces 7 and 8, which shoulder acts on one of the faces of the rotation sleeve 3 and forces it into an inclined position, that is, into a position where the longitudinal axis of the sleeve is at an angle with respect to the longitudinal axes of conduits 1 and 2, as shown in FIG. 1. The inclination of the rotational sleeve 3 further increases during the rotation, until the other front side of the rotation sleeve 3 comes to a stop on the other inner shoulder 6 or 5, respectively.

In the embodiment in accordance with FIG. 1 the slide cam 9 is situated on the inner shoulder 5 of pressure sleeve 10.

When the pressure of the medium rises, the sliding characteristics of the connecting apparatus hardly change since the slide diameter corresponding to the area of contact between pressure sleeve 10 and conduit 1 is substantially equivalent the diameter corresponding to the circle of contact between conical ring surface 7 or 8 and spherical superficies 4 of rotation sleeve 3. The above configuration leads to a hydrostatical compensation of the pressing force exerted by the medium. The inclined position of the rotation sleeve 3 is decisive in this respect for the operational security and the service life of the rotary transmission, because it causes lubrication of the sphere surface of the rotation sleeve in the area of the circles of contact with the two conical ring surfaces 7 and 8. The above leads to smoother sliding between the components of the apparatus, especially in a possible metallic contact, and also in coaxially aligned slide surfaces where wear of the components continuously occurs. Particularly at high speeds the course of the gap in tangential contact and lubricating movement forms an ideal liquid wedge which also enables an effective rinsing of the gap with the pressure medium in quasi pressureless operation.

Figure 3:
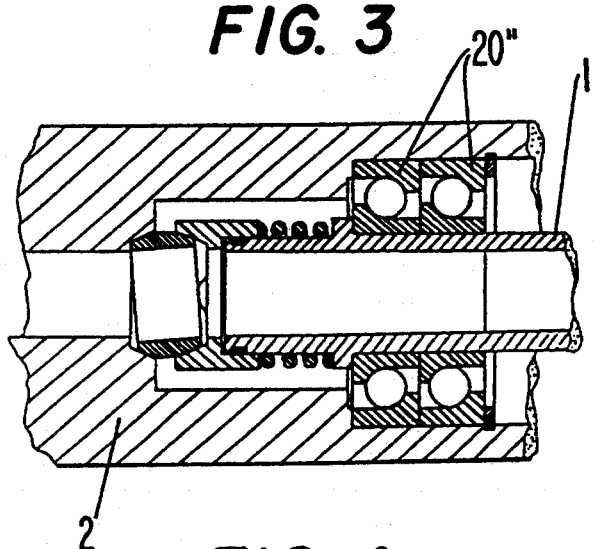
FIG. 3 is a schematic sectional view of an embodiment of the arrangement in accordance with FIG. 1.
Figure 4:
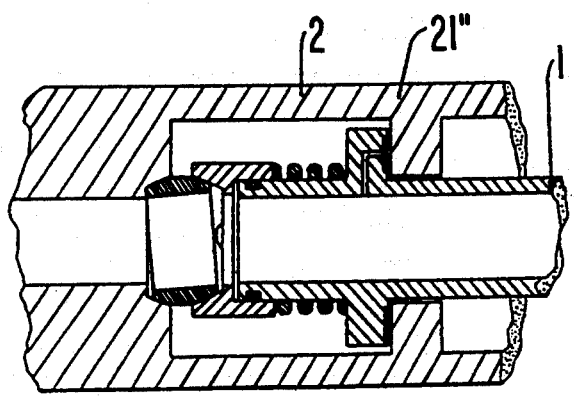
FIG. 4 is a schematic sectional view of a further embodiment of the arrangement in accordance with FIG. 1.

The radial support of such a rotary transmission as described above can be achieved by means of a roller bearing 20" in accordance with FIG. 3 or by means of a hydrostatical axial bearing 21" in accordance with FIG. 4.

Figure 2:
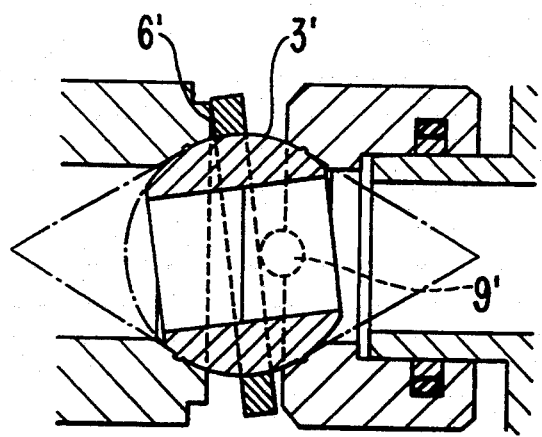
FIG. 2 is a schematic sectional view of an embodiment of the arrangement in accordance with FIG. 1.

In the embodiment in accordance with FIG. 2, however, the arrangement is such that the slide cam 9' is effective on an equatorial slide ring on the sleeve and forces the sleeve into an inclined position up to a stop of the slide ring provided on the faces thereof, as shown in FIG. 2.

Figure 5:
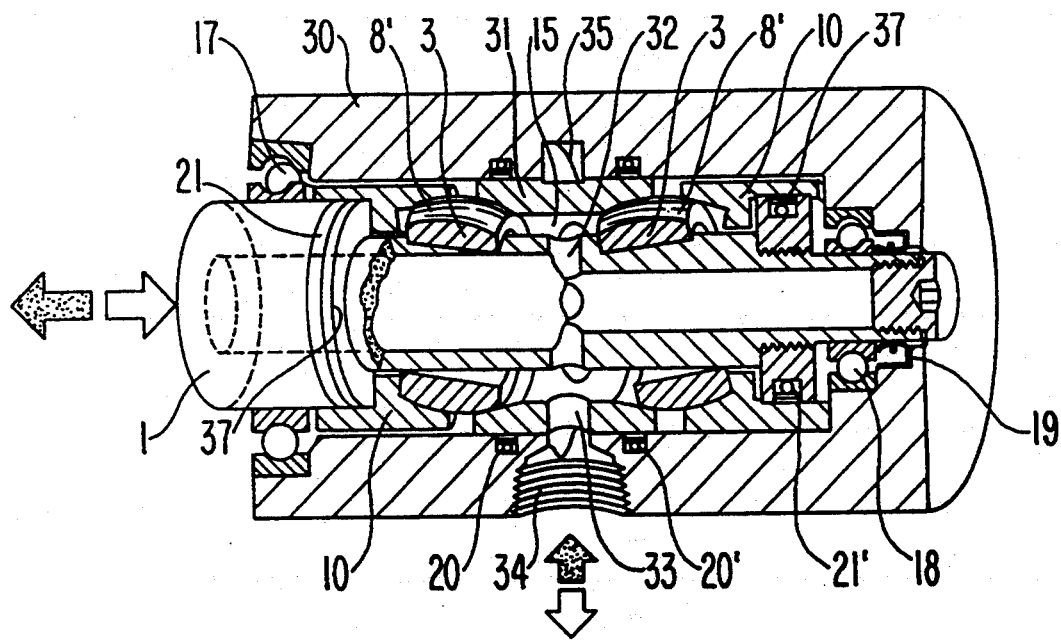
FIG. 5 is a schematic diagrammatic view, partly in a section, of a rotary transmission of radial design in accordance with the invention.

FIG. 5 shows a rotary transmission in accordance with the invention with radial deflection of the passage of the medium. For this purpose the rotating shaft-like conduit 1 for the axial supply of the medium is supported through bearing means 17,18 in a stationary casing 30, which in combination with the superficies of conduit 1 limits a ring-like pressure chamber 15 in which approximately centrally a symmetrical guide ring 31 is arranged rotationally rigidly and sealingly, which guide ring is provided at both front sides with conical ring surfaces 8' which are equivalent to the conical ring surface 8 in the fixed conduit 2 of the axial arrangement as mentioned above. Radial bores 32 in conduit 1 open out into pressure chamber 15 which is in a flow connection through at least one radial bore 33 in guide ring 31 with a transversal bore 34 in casing 30 through a ring duct 35, thus leading to a change of the axial direction of flow in a radial direction.

A rotation sleeve 3 with a spherical superficies (as described above) rests on either side of the guide ring 32 on its conical ring surfaces 8', which sleeves each cooperate on the opposite side with a pressure sleeve 10 which are situated rotationally rigidly and sealingly on the shaft-like conduit 1 and which rest on the countershoulders 37 of conduit 1 (as described above).

The shaft-like conduit 1 is recessed at its inner end, with a shaft gasket 19 occluding the leakage chamber there, whereas the pressure chamber 15 is occluded through a sealing means 21, 21' on the hollow shaft 1.

The rotation sleeves 3 in accordance with the invention now enable a hollow shaft 1 which in addition to a sufficiently large hydraulic cross section (nominal width) is also provided with a sufficiently large material cross section. This enables receiving even the highest axial tensional forces which arise by the pressure feed of the whole cross section of the sealing circle. Moreover, such a shaft-like conduit 1 is suitable for assuming other transmission functions.

Thus, the rotary transmission in accordance with the invention combines all advantages of axial rotary transmissions, i.e., small leakage rates, large hydraulic cross section, small resistance moment and favourable emergency running properties, with the advantages of radial rotary transmissions, i.e., no axial forces between the parts held rotatably with respect to one another, as well as a continuous hollow shaft, which enables further transmission functions.

A substantial advantage of the measures in accordance with the invention is the additional fact that the pressure sealed connecting apparatus can be used both as rotary transmission as well as high-pressure shaft seal.

While there are shown and described preferred embodiments of the invention, it is to be distinctly understood that the invention is not limited thereto but may be embodied and practised within the scope of the following claims.

What I claim is:

1. In a pressure sealed connecting apparatus for the connection of two conduits adapted to carry a pressure medium and to rotate relative to one another, the connecting apparatus comprising:

a first conduit and a second conduit adapted to carry a pressure medium therein and to rotate relative to one another, each of the first conduit and the second conduit having tangentially contacting countersurfaces for contacting spherical surface areas of a rotation body;

a rotation body situated between the first conduit and the second conduit and having spherical surface areas adapted to be in rotational and sealing frictional contact with the tangentially contacting countersurfaces of each the first conduit and the second conduit;

the improvement wherein:

the rotation body is sleeve-shaped;

each of the first conduit and the second conduit has an inner shoulder thereon;

the tangentially contacting countersurfaces of each of the first conduit and the second conduit are conical ring surfaces axially limited by corresponding inner shoulders on the first conduit and the second conduit;

the spherical surface areas of the rotation body are zone-like equatorial superficies resting on the conical ring surfaces; and the connecting apparatus further comprises:

a slide cam disposed on the inner shoulder of one of the first conduit and the second conduit for acting on the rotation body to force the rotation body into an inclined position; and a stop disposed on the inner shoulder of the other one of the first conduit and the second conduit such that the slide cam forces the sleeve into the inclined position up to the stop.

2. A connecting apparatus according to claim 1 and further including an equatorial slide ring on the rotation body having a front face including a slide ring stop thereon, wherein:

the slide cam acts on the slide ring on the rotation body and forces the rotation body into an inclined position up to the slide ring stop.

3. In a pressure sealed connecting apparatus for the connection of two conduits carrying a pressure medium and rotating relative to one another, the connecting apparatus comprising:

a fixed conduit having a front end and a rotating conduit adapted to rotate relative to the fixed conduit, the fixed conduit and the rotating conduit being adapted to carry a pressure medium therein, the fixed conduit further having tangentially contacting countersurfaces for contacting spherical surface areas of a rotation body;

a rotation body situated between the fixed conduit and the rotating conduit and having spherical surface areas adapted to be in rotational and sealing frictional contact with the tangentially contacting countersurfaces of the fixed conduit;

the improvement comprising:

a pressure sleeve having first conical ring surfaces formed on a front end thereof for contacting spherical surface areas of the rotation body, the rotation body thereby being in rotational and sealing frictional contact with the first conical ring surfaces of the pressure sleeve, the pressure sleeve further being disposed rotationally rigidly with respect to and sealingly on the rotating conduit, the pressure sleeve and the rotating conduit thereby defining an area of contact therebetween; and a spring for resisting an axial displacement of the pressure sleeve on the rotating conduit;

wherein:

the rotation body is sleeve-shaped;

the tangentially contacting countersurfaces of the fixed conduit comprise second conical ring surfaces formed on the front end of the fixed conduit;

the spherical surface areas of the rotation body are zone-like equatorial superficies resting on the conical ring surfaces, whereby respective circles of contact are defined between the first conical ring surfaces and the equatorial superficies, and the second conical ring surfaces and the equatorial superficies; and the connecting apparatus further comprises a slide cam disposed on one of the first conduit and the second conduit for acting on the rotation body to force the rotation body into an inclined position.

4. A connecting apparatus according to claim 3, wherein:

the pressure sleeve includes an inner shoulder; and the slide cam is provided on the inner shoulder of the pressure sleeve.

5. A connecting apparatus according to claim 3, wherein:

a slide diameter corresponding to the area of contact between the pressure sleeve and the rotating conduit is substantially equivalent to the circles of contact between the conical ring surface and the superficies of the rotation body.

6. In a pressure sealed connecting apparatus for the connection of two conduits adapted to carry a pressure medium and to rotate relative to one another, the connecting apparatus comprising:

a first conduit and a second conduit adapted to carry a pressure medium therein and to rotate relative to one another, each of the first conduit and the second conduit having tangentially contacting countersurfaces for contacting spherical surface areas of a rotation body;

a rotation body situated between the first conduit and the second conduit and having spherical surface areas adapted to be in rotational and sealing frictional contact with the tangentially contacting countersurfaces of each the first conduit and the second conduit;

the improvement wherein:

the rotation body is sleeve-shaped;

the tangentially contacting countersurfaces of each of the first conduit and the second conduit are conical ring surfaces;

the spherical surface areas of the rotation body are zone-like equatorial superficies resting on the conical ring surfaces;

the connecting apparatus further comprises a slide cam disposed on one of the first conduit and the second conduit for acting on the rotation body to force the rotation body into an inclined position; and one of the first conduit and the second conduit is a rotating conduit which is axially supported through one of a rotary bearing and a hydrostatic axial bearing.

7. In a pressure sealed connecting apparatus for the connection of two conduits adapted to carry a pressure medium and to rotate relative to one another, the connecting apparatus comprising:

a first conduit and a second conduit adapted to carry a pressure medium therein and to rotate relative to one another;

at least one rotation body situated between the first conduit and the second conduit and having spherical surface areas;

the improvement wherein:

the at least one rotation body is sleeve-shaped;

the spherical surface areas of the at least one rotation body are zone-like equatorial superficies resting on the conical ring surfaces;

the connecting apparatus further comprises:

a slide cam disposed on one of the first conduit and the second conduit for acting on the at least one rotation body to force the at least one rotation body into an inclined position;

a casing coaxially encompassing the first conduit and the second conduit thereby defining a centerline axis of the connecting apparatus, the casing having a transverse bore therein;

a pressure sleeve coaxially encompassing the first conduit; and wherein:

one of the two conduits is a rotating conduit;

another one of the two conduits is a fixed guide ring which is symmetrical with respect to the centerline axis and which coaxially encompasses the rotating conduit, whereby a pressure chamber is defined between the guide ring and the rotating conduit, the guide ring further having radial bores therein leading into the pressure chamber such that the pressure chamber is in flow communication with the transverse bore in the casing, the guide ring further including two ends each of which has conical ring surfaces thereon;

the at least one rotation body includes two rotation bodies each having equatorial superficies thereon, an inner end, and an outer end, the two rotation bodies further being in rotational and sealing frictional contact with corresponding conical ring surfaces of the guide ring at inner ends thereof; and the pressure sleeve is disposed such that the two rotation bodies are in rotational and sealing frictional contact with corresponding conical ring surfaces of the pressure sleeve at outer ends thereof.

* * * * *